June 29, 1971 K. WANDEL 3,589,964
REINFORCED CORRUGATED BOARD MEMBER
Filed April 30, 1969 3 Sheets-Sheet 2
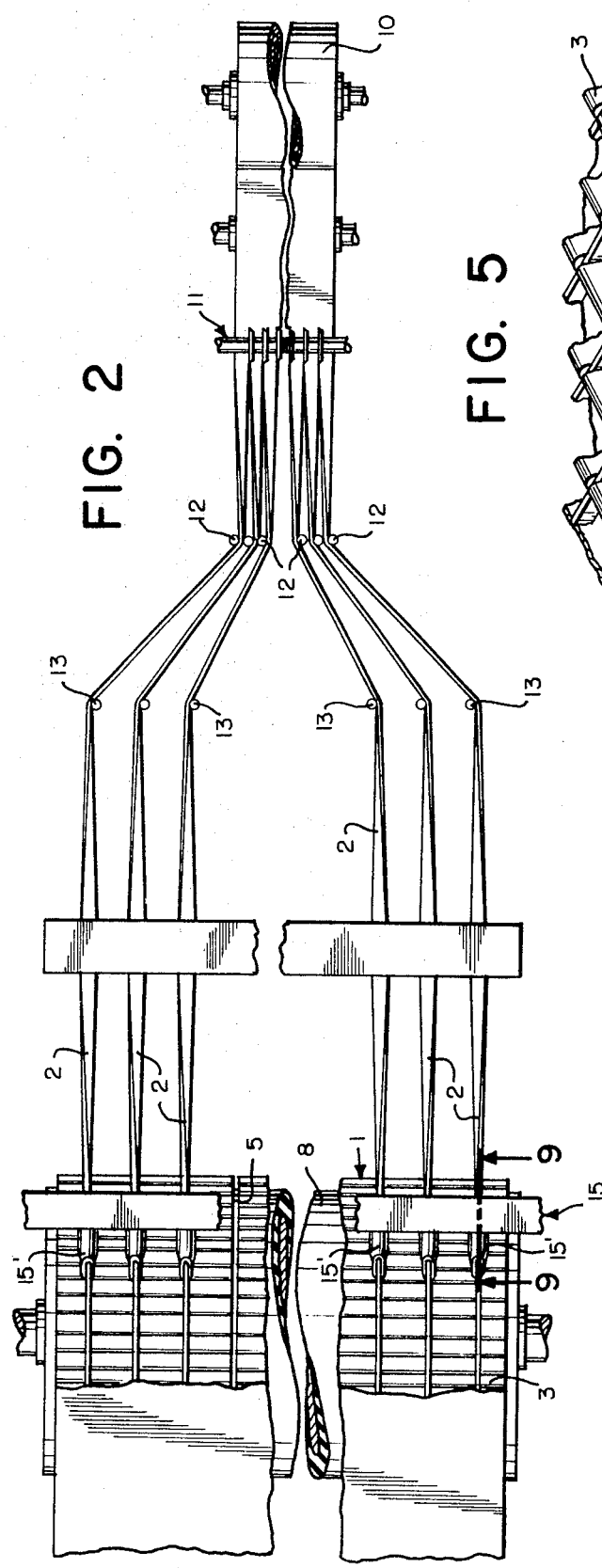
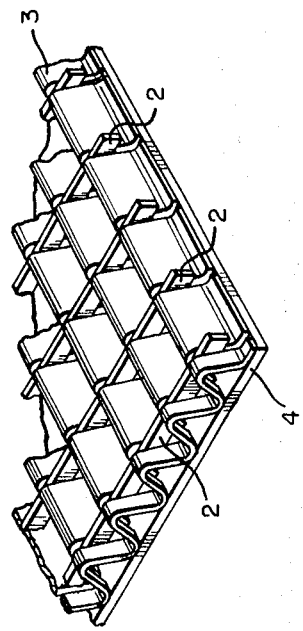
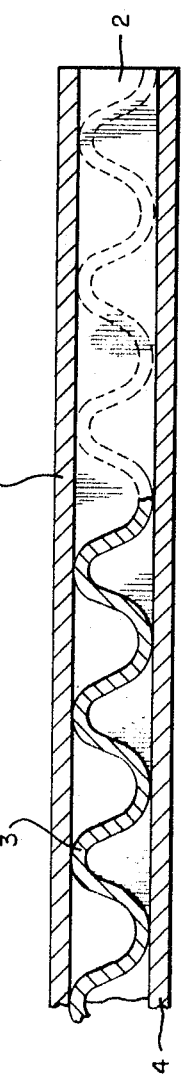
INVENTOR
KURT WANDEL
BY
ATTORNEYS June 29, 1971 K. WANDEL 3,589,964
REINFORCED CORRUGATED BOARD MEMBER
Filed April 30, 1969 3 Sheets-Sheet 3

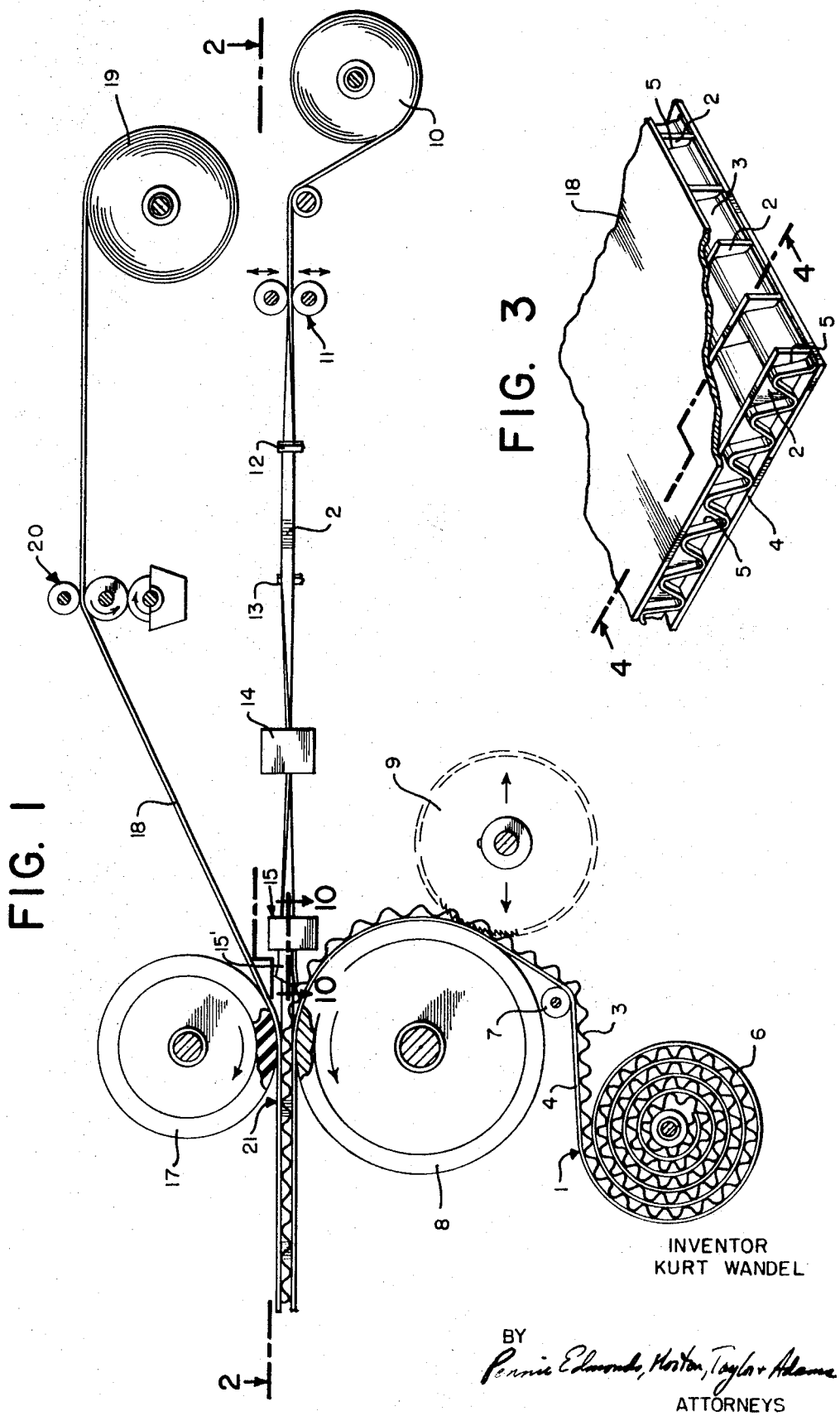

INVENTOR
KURT WANDEL

BY
*Pennie, Edmonds, Morton, Taylor Adams*
ATTORNEYS

United States Patent Office 3,589,964
Patented June 29, 1971

3,589,964
REINFORCED CORRUGATED BOARD MEMBER
Kurt Wandel, R.D. 1, Downingtown, Pa. 19335
Continuation-in-part of application Ser. No. 475,402,
July 28, 1965. This application Apr. 30, 1969, Ser.
No. 820,452
Int. Cl. B32b 31/00
U.S. Cl. 156—268
12 Claims

ABSTRACT OF THE DISCLOSURE

A reinforced corrugated member and the method and apparatus for making same wherein the member includes a corrugated sub-member having a corrugated web and facing web adhered thereto, a plurality of slits in the exposed flutes of the sub-member and a plurality of strips of reinforcing material secured in the slits.

RELATED APPLICATION

This application is a continuation-in-part of applicant's copending application, Ser. No. 475,402, filed July 28, 1965, now Pat. No. 3,449,157.

BACKGROUND OF THE INVENTION

Presently available corrugated board is generally comprised of a single web of corrugated material adhesively secured between two facing webs of material. Such board is usually produced in a continuous fashion with the corrugations extending transversely of the web. Corrugated board of this nature has found many uses; a primary one of which is in the construction of shipping boxes. This type of board, however, does have certain disadvantages. For example, since the corrugations extend in only one direction, the board has only one-way strength and rigidity; that is, it can resist bending along lines extending at right angles to the corrugations but can bend easily along lines extending parallel to the corrugations. In some applications where complete rigidity of the board is desired, this one-way strength would be disadvantageous.

Also, with presently available corrugated board, the corrugated construction provides some resistance to crushing; however, there is a limit to the compressive forces which the board can sustain before collapse. Where maximum crushing strength is desired, it is common to use a double walled corrugated structure. Such a structure includes two corrugated board members adhered to each other with the corrugations of the two boards extending at right angles with respect to each other. Actually, much of the increased resistance to crushing of such a product is derived simply from the fact that two corrugated boards rather than one are being used. Obviously, the cost of such a product is much greater than the single board structure and, in many cases, prohibitive when measured against the increased crushing strength produced.

Another disadvantage of conventional corrugated board stems from the open flute construction at the edges of the board. These openings permit ingress of moisture into the interior of the board which can be of disadvantage. Also, this open construction does not readily adapt the board to uses where insulating and sound proofing qualities are desired.

In addition to the above, the manufacture of presently available corrugated board presents some problems. In production, the corrugated web is first formed and then adhesively united on one side to a facing web. If a single face corrugated board is being produced, that is, one with only one facing web, care must be exercised in the handling of the board and sufficient time allowed for the adhesive uniting the corrugated web to the facing web to dry. Otherwise, the corrugated web will be readily susceptible to distortion and flattening.

If, on the other hand, the single face sub-member is to be provided with a second facing web on the other side of the corrugated web, care must be taken to maintain the desired caliper of the finished board. Since this second web is applied by adhesive and requires some pressure to secure it to the corrugated web, controls are required for regulating the speed of the product through the station where the second web is applied and for regulating the pressure exerted in pressing the second web against the exposed flutes of the sub-member. Generally, a slow production speed is required to allow sufficient time for drying of the adhesive uniting the corrugated web to the first facing web. This drying is necessary so that the corrugated web will not readily flatten out when pressure is applied as the second facing web is being secured. Also, even with sufficient drying of the corrugated web to the first facing web, the mechanism for applying the second facing web must be set at a relatively light pressure value so as to avoid crushing of the corrugated structure. This, however, does not facilitate strong adhesion of the second facing web to the corrugated sub-member.

SUMMARY OF THE INVENTION

In accordance with the teaching of the present invention, a reinforced corrugated board member having superior strength characteristics and other advantageous features is provided. The reinforced corrugated member generally comprises a corrugated web material which is secured on one side to a facing web and which is provided with slits extending transversely of the corrugations. Strips of reinforcing material, such as the paperboard material, are secured on edge in the slits.

In production, this reinforced corrugated member may be produced in a continuous fashion as part of a conventional corrugating apparatus or as a separate operation on previously produced single facedboard. In either case, a length of single faced corrugated board is fed continuously in a direction along its length through a suitable slitting apparatus where a plurality of laterally spaced slits, extending transversely to the corrugations, are formed. At the same time this operation is being performed, a web of reinforcing material is fed from a supply and slit into individual strips. These strips are then fed along a path merging with the path of movement of the corrugated sub-member and into the slits therein.

The procedure described above produces a reinforced single-faced corrugated member having increased rigidity particularly against bending about an axis extending parallel to the corrugations. Also, this reinforced structure is admirably resistant to crushing and provides a board which is vastly superior to conventional corrugated single faced or double faced boards and may readily be used for constructing shipping containers. Also, where a second facing material is to be included in the reinforced corrugated member of the present invention, it may be adhesively secured to the single face structure with sufficient pressure to assure a proper bonding and without fear of flattening or crushing of the flutes of corrugated web. This is so since the width of the upright strips in the corrugated member will control the caliper of the resulting product. These strips being on edge are quite resistant to any crushing forces exerted in applying the second facing material.

The corrugated structure of the present invention not only provides a product which is superior in crushing strength and stiffness, but one that attains these features with a minimum of increased weight over conventional corrugated structures. Shipping boxes formed from such reinforced structure, either the single faced or double faced variety, can carry far greater weights and are not readily susceptible to damage during handling. The reinforced corrugated member of the present invention can also be used as building panels in much the same manner as plywood sheets are used today. Also, due to the compartmentalized structure formed by the reinforcing strips, these boards have desirable sound proofing and insulating properties.

BRIEF DESCRIPTION OF THE DRAWINGS

FIG. 1 is a side elevation of the apparatus for forming the reinforced corrugated member of the present invention;

FIG. 2 is a cross-sectional view taken along lines 2—2 of FIG. 1;

FIG. 3 is a perspective view of a reinforced corrugated member of the present invention as formed by the apparatus of FIG. 1;

FIG. 4 is a sectional view of the corrugated member shown in FIG. 3;

FIG. 5 is a sectional view of an embodiment of the invention similar to that shown in FIG. 4 with the reinforcing strips being oriented in a floating manner;

DESCRIPTION OF THE PREFERRED EMBODIMENTS

Figure 6:
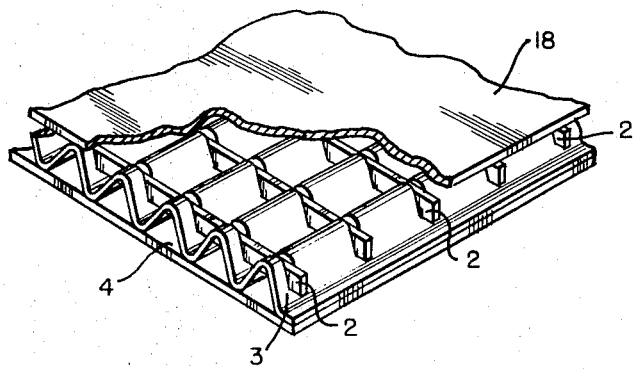
FIG. 6 is a sectional view of another embodiment of the invention similar to that shown in FIG. 5.

As shown in FIGS. 1, 2 and 3, the reinforced corrugated member of the present invention is formed from a single corrugated sub-member 1 and separate reinforcing strips 2. The sub-member comprises a single faced corrugated board constructed from a transversely corrugated web 3 and a facing web 4 adhesively united to one side thereof.

With reference to FIG. 3, it is seen that the reinforcing strips 2 are secured in slits 5 formed in the exposed flutes of the corrugated sub-member. These slits extend in spaced rows at right angles to the corrugations of the sub-member; and as shown in FIG. 4, the depth of these slits is equal to the thickness of the corrugated web 3 as defined by the height of the flutes. In other words, the slits extend completely through the corrugated web 3 and stop short of penetrating the facing web 4.

In production, the slits 5 are readily formed in the corrugated sub-member as the latter moves along a path extending transversely to the corrugations. As shown in FIG. 1, the corrugated sub-member is fed from a supply 6 past a guide roll 7 and around the curved surface of a rotating support from 8. In being fed around this drum, the corrugated sub-member is curved or bent about an axis extending parallel to its corrugations with the exposed flutes facing outwardly of the curved path. Cooperating with this support drum 8 are a plurality of saw blades 9 suitably mounted for adjustment toward and away from the support drum 8. The number of saw blades provided will correspond to the number of slits to be cut into the corrugated sub-member. In a typical construction where the corrugated sub-member is six feet in width, enough blades may be provided for cutting slits at one half inch intervals.

For forming the reinforcing strips 2, a supply of reinforcing web material 10 is provided. This web material is unwound from its supply and fed through a suitable slitter mechanism shown at 11. This mechanism cuts the web into individual strips of the desired width. Generally, the width of the strips will be equal to or slightly less than the depth of the slits 5 cut into the corrugated sub-member. A width equal to the depth of the slits will be used where maximum strength is desired and a width less than the depth of the slits will be used where the board is to be provided with more of a cushioning characteristic. Preferably, the thickness of the strips will equal the width of the slits so that it can be secured therein by friction.

After the web material 10 is slit into the individual strips 2, these strips are fed through guide members 12 and 13 which together turn the individual strip into a vertical orientation and space them apart by a distance corresponding to the spacing of the slits 5 in the corrugated sub-member. The guide member 12 assures that the strips will stay properly aligned with the knives of the slitter mechanism at the outlet thereof. After the strips are turned and spaced, they are fed through an adhesive applicator 14. The applicator is filled with adhesive so that the strips are submerged in the adhesive as they pass through the applicator. Thus, adhesive is applied to both surfaces and the edges of the strips.

Figure 9:
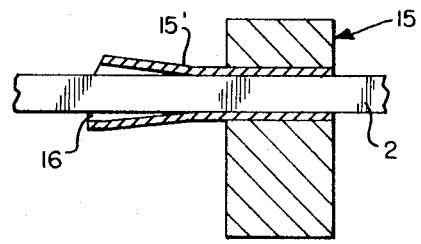
FIG. 9 is a sectional view taken along lines 9—9 of FIG. 2.
Figure 10:
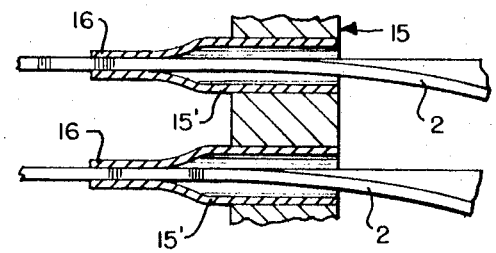
FIG. 10 is a sectional view taken along lines 10—10 of FIG. 1.

When the strips pass through the adhesive applicator, they are turned back into a horizontal plane; and for finally aligning them with the slits in the corrugated sub-member, a turning guide 15 is provided. As shown in FIGS. 9 and 10, this guide comprises a plurality of tube members 15' through which the strips 2 are fed. The tubes each have a restricted outlet 16 arranged in a vertical plane; and as shown in FIGS. 1 and 2, each outlet is closely aligned with an individual slit of the corrugated sub-member to assist in feeding the strips into the slits.

A guide means in the form of a pressure roll 17 is disposed in cooperating relationship with the support drum 8 and spaced therefrom by a distance substantially equal to the thickness of the corrugated member which is being formed. This pressure roll 17 serves to direct the individual strips 2 into the slits 5 of the corrugated sub-member and also serves to feed the resulting structure forwardly to a position where it may be collected. In the case where a second facing web such as shown at 18 is to be included in the corrugated member, the pressure roll 17 also serves to press this web against the exposed flutes of the corrugated sub-member. As shown in FIG. 1, the second facing web 18 may be fed from a suitable supply 19 and through an adhesive applicator mechanism 20 where a coating of adhesive is applied to its undersurface.

In the apparatus shown in FIG. 1, the adhesive applicator 14 is included for applying adhesive to the individual reinforcing strips. Since, however, the strips are preferably formed from a sheet material having a thickness equal to the width of the slits cut into the corrugated sub-member, it is not essential that they be secured to the sub-member by adhesive. It is sufficient to simply rely on the friction fit of the strips within the slits; and this is especially so in the double faced construction of the invention where the two facing webs enclose the strips. As will be seen from FIG. 1, the reinforcing strips 2, once inserted into the slits of the corrugated sub-member, will be held there without further attention. With a single face construction, it would be more desirable to use adhesive to secure the strips since they are more subject to being removed from the slits during handling.

Figure 8:
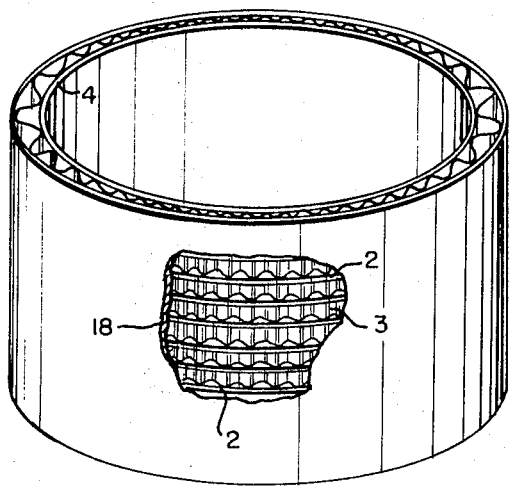
FIG. 8 is a perspective view of a curved embodiment of the corrugated board member formed in accordance with the teaching of the present invention.

An adhesive connection of the strips in the slits of the sub-member may also be desirable where the curved construction shown in FIG. 8 is to be formed. Here, the reinforced member as it exits from the forming apparatus at the location 21 is cut to an appropriate length which is then curved or bent about an axis extending parallel to the corrugations to form the tubular or cylindrical structure. In bending the member in this manner, it is necessary that the reinforcing strips be bent on their edge. It has been found that these strips inherently have some degree of resiliency permitting an amount of bending sufficient to form the cylindrical shape shown in FIG. 8. However, the bending of the strips is facilitated where they are coated with adhesive. The moisture in the adhesive softens them and makes them more adaptable to bending. The adhesive also acts to assist in holding the cylindrical form of the structure shown in FIG. 8 after the adhesive has set.

As indicated above, the width of the reinforcing strips in the reinforced member of the present invention may be either equal to or less than the depth of the slits in the sub-member. Where it is desirable to provide a corrugated member of maximum strength, the width of the strips would be made equal to the depth of the slits as shown in FIGS. 3 and 4. Here, the strips would immediately act to resist any crushing forces applied to the opposed surface of the board member.

Where, on the other hand, it is desired to provide a construction which has more of a cushioning affect, the strips are oriented in a floating manner between the facing webs as shown in FIG. 5 of the drawings. Here the strips are positioned in spaced relationship to the facing web 4 and to the crest surfaces of the flutes of the corrugated web 3. The floating strips may be held in this position by friction alone or by adhesive, as desired. With this construction, an initial flattening of the corrugated board will be permitted until the caliper of the board has been reduced to the width of the reinforcing strips. At this point, the board will provide an increase resistance to further crushing.

As shown in the double faced structure of FIG. 6, positioning of the strips in spaced relationship to the opposed facing webs may be provided by cutting the slits in the corrugated web 3 of the sub-member to a depth less than the thickness of the corrugated web. The bottom of these slits as they pass through the corrugated web would then provide a support for the strips being inserted.

Figure 7:
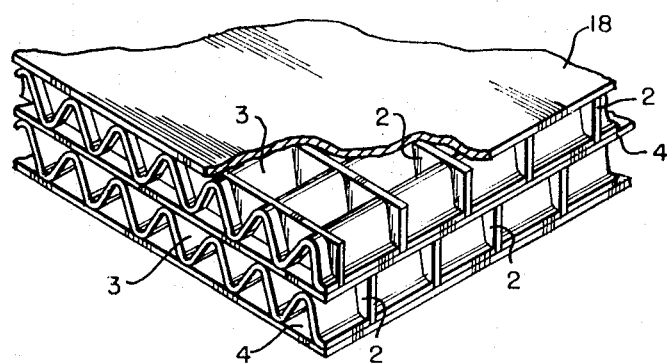
FIG. 7 is a sectional view of still another modified embodiment of the corrugated member of the present invention.

Although in the presently preferred embodiments of the reinforced corrugated members of the present invention, the reinforcing strips are disposed at equally spaced intervals across the board, variations of this design may be made without departing from the scope of the invention. For example, the reinforcing strips may be inserted in one board in one particular pattern. A second board may then be provided with reinforcing strips offset in position relative to the positioning of the strips in the first board. These two boards may then be combined to produce multiple wall assembly such as shown in FIG. 7.

The reinforcing strips not only produce a stronger board member; but also function to seal the corrugations at the edges of the board. If desired, the reinforcing strips may be inserted along only the edges of the board. In either case, the board is admirably suited for filling with insulating or sound proofing material.

For varying the effect of the reinforcing strips, their caliper may be changed. Thicker strips provide more rigidity. Also, other materials such as plastics, wood, metal, and woven fibrous materials may be used for producing particular results.

I claim:

1. The method of producing a reinforced corrugated member comprising the steps of:
   (a) providing a corrugated sub-member, said sub-member including:
      (1) a corrugated web, and
      (2) a facing web united to one side of said corrugated web;
   (b) cutting a plurality of slits in the exposed flutes of said corrugated sub-member, said slits extending in spaced rows and at right angles to the corrugations thereof;
   (c) providing a plurality of strips of material each of which has a thickness and width no greater than the width and depth, respectively, of the slits in said corrugated sub-member;
   (d) securing each of said strips on edge in separate slits of the corrugated sub-member.

2. The method according to claim 1 wherein:
   the slits are cut to a depth equal to the thickness of the corrugated web as defined by the height of the flutes.

3. The method according to claim 2 wherein:
   an adhesive is applied to said strips prior to insertion into the slits of the corrugated sub-member.

4. The method according to claim 2 further including the steps of:
   (a) bending the corrugated sub-member, with the strips positioned in the slits thereof, about an axis extending parallel to said corrugations prior to setting of said adhesive; and
   (b) holding the corrugated sub-member in said bent configuration until the adhesive sets to unite said strips to the opposed surfaces of the flutes as formed by the slits therein.

5. The method according to claim 2 further including the step of:
   uniting a facing web to the other side of the corrugated web of the sub-member after the insertion of the strips into the slits thereof.

6. The method of producing a reinforced corrugated member comprising the steps of:
   (a) feeding a transversely corrugated sub-member along a first path extending perpendicular to the corrugations thereof, said corrugated sub-member including:
      (1) a transversely corrugated elongated web, and
      (2) a facing web united to one side of said corrugated web;
   (b) cutting a plurality of slits in the exposed flutes of said corrugated sub-member, said slits extending in spaced rows and at right angles to said corrugations;
   (c) feeding a web of material along a second path, said web having a thickness substantially equal to the width of the slits in said corrugated sub-member;
   (d) cutting said web of material longitudinally at spaced intervals across its width to form individual strips each of which has a width no greater than the depth of said slits; and
   (e) feeding each of said strips along said first path and into separate slits of the corrugated sub-member.

7. The method according to claim 6 wherein:
   (a) a portion of said first path is curved about an axis extending parallel to the corrugations of the sub-member; and
   (b) said strips are fed into the separate slits of the sub-member as the latter passes along the curved portion of said first path.

8. The method according to claim 7 wherein the individual strips are initially fed into separate slits in the corrugated sub-member by:
   (a) feeding the leading end of each strip through a tubular guide having a restricted outlet which turns the strip into alignment with one of the slits in the corrugated sub-member; and
   (b) urging said strips transversely of their path of movement into the aligned slits.

9. Apparatus for producing a reinforced corrugated member comprising:
   (a) means for feeding a corrugated sub-member to a combing station, said sub-member including:
      (1) a corrugated web, and
      (2) a facing web united to one side of said corrugated web;
   (b) means for cutting a plurality of slits in the exposed flutes of said corrugated sub-member in spaced rows extending at right angles to the corrugations thereof;
   (c) means for feeding a plurality of strips of material each of which has a thickness and width substantially equal to the width and depth, respectively, of the slits in said corrugated sub-member; and (d) means for securing each of said strips on edge in separate slits of the corrugated sub-member.

10. Apparatus for producing a reinforced corrugated member comprising:
(a) means for holding a supply of a transversely corrugated sub-member, said sub-member including:
(1) a transversely corrugated elongated web, and
(2) a facing web united to one side of said corrugated web;
(b) slitting means for cutting a plurality of slits in the exposed flutes of said corrugated sub-member in spaced rows extending at right angles to the corrugations thereof;
(c) guide means for directing said corrugated sub-member along a curved first path with the exposed flutes facing outwardly of said curved path;
(d) means for holding a supply of web material having a thickness substantially equal to the width of the slits in said corrugated sub-member;
(e) slitting means for cutting said web inwardly of its leading end and longitudinally at spaced intervals across its width into individual strips each of which has a width no greater than the depth of said slits;
(f) strip guide means for directing said strips into alignment with the separate slits of the corrugated sub-member; and
(g) means for directing the leading end of said web material along said first path with said corrugated sub-member and in overlying engagement with the exposed flutes thereof and for urging said strips transversely of their path of movement into the aligned slits.

11. Apparatus according to claim 10 wherein:
said strip guide means includes means disposed between said supply of web material and the point at which the strips enter the slits in the corrugated sub-member and having surfaces for turning said strips about their axis of movement into parallel relationship with the shape of said slits and for spreading them apart laterally of their path of movement and into axial alignment with said slits.

12. Apparatus according to claim 10 further including:
means for adhesively uniting a facing web to the exposed flutes of the corrugated sub-member after the insertion of the strips therein.

References Cited
UNITED STATES PATENTS

| | | | |
|---|---|---|---|
| 1,996,490 | 4/1935 | Romanoff | 161—Cellular Digest |
| 2,166,819 | 7/1939 | Miller | 156—271 |
| 3,041,223 | 6/1962 | Sage | 161—Cellular Digest |
| 3,070,480 | 12/1962 | Breiner | 156—207X |

BENJAMIN A. BORCHELT, Primary Examiner

R. E. HART, Assistant Examiner

U.S. Cl. X.R.

161—Cellular Digest; 156—271